US009798528B2

(12) United States Patent
Gao et al.

(10) Patent No.: US 9,798,528 B2
(45) Date of Patent: Oct. 24, 2017

(54) SOFTWARE SOLUTION FOR COOPERATIVE MEMORY-SIDE AND PROCESSOR-SIDE DATA PREFETCHING

(75) Inventors: Yaoqing Gao, North York (CA); Gheorghe C. Cascaval, Carmel, NY (US); Allan H. Kielstra, Ajax (CA); Robert B. Tremaine, Stormville, NY (US); Michael E. Wazlowski, Fairfield, CT (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2037 days.

(21) Appl. No.: 11/531,313

(22) Filed: Sep. 13, 2006

(65) Prior Publication Data

US 2008/0127131 A1 May 29, 2008

(51) Int. Cl.
G06F 9/45 (2006.01)
G06F 12/0811 (2016.01)
(Continued)

(52) U.S. Cl.
CPC ............. *G06F 8/4442* (2013.01); *G06F 8/40* (2013.01); *G06F 8/41* (2013.01); *G06F 8/443* (2013.01);
(Continued)

(58) Field of Classification Search
USPC ....... 717/140, 141, 151, 152, 153, 154, 155, 717/161; 712/237; 711/137, 118, 119,
(Continued)

(56) References Cited

U.S. PATENT DOCUMENTS 5,197,141 A * 3/1993 Ito .................................. 712/205
5,357,618 A * 10/1994 Mirza et al. ...................... 711/3
(Continued)

FOREIGN PATENT DOCUMENTS

JP 2000207224 A 7/2000

OTHER PUBLICATIONS

Yang et al, "Push vs. Pull: Data Movement for Linked Data Structures", 2000, ACM, pp. 176-186.*
(Continued)

*Primary Examiner* — Charles Swift
(74) *Attorney, Agent, or Firm* — Steven M. Greenberg, Esq.; CRGO Law

(57) ABSTRACT

A solution for cooperative data prefetching that enables software control of a memory-side data prefetch and/or a processor-side data prefetch is provided. In one embodiment, the invention provides a solution for generating an application, in which access to application data for the application is improved (e.g., optimized) in program code for the application. In particular, a push request, for performing a memory-side data prefetch of the application data, and a prefetch request, for performing a processor-side data prefetch, are added to the program code. The memory-side data prefetch results in the application data being copied from a first data store to a second data store that is faster than the first data store while the processor-side data prefetch results in the application data being copied from the second data store to a third data store that is faster than the second data store.

22 Claims, 5 Drawing Sheets

(51) Int. Cl.
*G06F 12/08* (2016.01)
*G06F 12/0862* (2016.01)

(52) U.S. Cl.
CPC ............ *G06F 8/4441* (2013.01); *G06F 12/08* (2013.01); *G06F 12/0811* (2013.01); *G06F 12/0862* (2013.01); *G06F 2212/6028* (2013.01)

(58) Field of Classification Search
USPC ........................................................ 711/122
See application file for complete search history.

(56) References Cited

U.S. PATENT DOCUMENTS

| | | | | |
|---|---|---|---|---|
| 5,996,061 | A * | 11/1999 | Lopez-Aguado et al. .... | 712/207 |
| 6,157,993 | A * | 12/2000 | Lewchuk ...................... | 711/213 |
| 6,460,115 | B1 * | 10/2002 | Kahle et al. .................. | 711/122 |
| 6,574,712 | B1 * | 6/2003 | Kahle et al. .................. | 711/137 |
| 6,636,945 | B2 * | 10/2003 | Nakamura .................... | 711/137 |
| 6,668,307 | B1 * | 12/2003 | Damron ................... | G06F 9/383 |
| | | | | 711/137 |
| 6,711,668 | B1 | 3/2004 | Wojcieszak et al. | |
| 6,915,415 | B2 * | 7/2005 | Mayfield et al. ............. | 712/225 |
| 7,089,399 | B2 * | 8/2006 | Tetrick .......................... | 711/213 |
| 7,430,650 | B1 * | 9/2008 | Ross ............................. | 711/213 |
| 7,480,769 | B2 * | 1/2009 | Diefendorff et al. ......... | 711/137 |
| 7,506,106 | B2 * | 3/2009 | Diefendorff ................... | 711/137 |
| 7,509,459 | B2 * | 3/2009 | Diefendorff ................... | 711/137 |
| 7,512,740 | B2 * | 3/2009 | Diefendorff ................... | 711/137 |
| 7,702,856 | B2 * | 4/2010 | Krishnaiyer ............ | G06F 9/383 |
| | | | | 711/137 |
| 2003/0065888 | A1 * | 4/2003 | Nishiyama ............ | G06F 8/4442 |
| | | | | 711/137 |
| 2003/0088864 | A1 * | 5/2003 | Tirumalai ............. | G06F 8/4442 |
| | | | | 717/160 |
| 2006/0048120 | A1 * | 3/2006 | Archambault et al. ....... | 717/160 |
| 2007/0088915 | A1 * | 4/2007 | Archambault ........ | G06F 8/4442 |
| | | | | 711/137 |

OTHER PUBLICATIONS

Chen, T., "An Effective Programmable Prefetch Engine for On-Chip Caches", 1995 IEEE, Proceedings of MICRO-28, pp. 237-242.

Chiueh, T., "Sunder: A Programmable Hardware Prefetch Architecture for Numerical Loops", Proceedings of Supercomputing 1994, 1994 IEEE, pp. 488-497.

Mehrotra, S., "Examination of a memory access classification scheme for pointer-intensive and numeric programs", Proceedings of the 10th ACM International Conference on Supercomputing, 1996 ACM, pp. 1-32.

Roth, A. et al., "Dependence Based Prefetching for Linked Data Structures", Eighth International Conference on Architectural Support for Programming Languages and Operating Systems, Oct. 1998, pp. 115-126.

Yang, C. et al., "Push vs. Pull: Data Movement for Linked Data Structures", Proceedings of the International Conference on Supercomputing, Santa Fe New Mexico, ACM 2000, pp. 176-186.

Karlsson, M. et al., "A Prefetching Technique for Irregular Accesses to Linked Data Structures", Proceedings of the 6th International Symposium on High Performance Computer Architecture, Jan. 2000, pp. 1-12.

Luk, C, et al., "Compiler-Based Prefetching for Recursive Data Structures", Seventh International Conference on Architectural Support for Programming Languages and Operating Systems, Oct. 1996, pp. 222-233 (pp. 1-12 in copy provided).

Roth, A. et al., "Effective Jump-Pointer Prefetching for Linked Data Structures", Proceedings of the 26th Annual International Symposium on Computer Architecture, May 1999, pp. 1-11.

Joseph, D. et al., "Prefetching using Markov Predictors", Proceedings of the 24th International Symposium on Computer Architecture, Jun. 1997, pp. 1-11.

Sherwood, T. et al., "Predictor-Directed Stream Buffers", Proceedings of the 33rd Annual International Symposium on Microarchitecture (MICRO-33), Dec. 2000, pp. 42-53 (pp. 1-12 in copy provided).

Kohout, N. et al., "Multi-Chain Prefetching: Effective Exploitation of Inter-Chain Memory Parallelism for Pointer-Chasing Codes", Proceedings of the 10th Annual International Conference on Parallel Architectures and Compilation Techniques, Barcelona, Spain, Sep. 2001, pp. 1-12.

Stoutchinin, A. et al., "Speculative Prefetching of Induction Pointers", Proceedings of the 10th International Conference on Compiler Construction, 2001, pp. 289-303.

Zhang, L. et al., "Pointer-Based Prefetching within the Impulse Adaptable Memory Controller: Initial Results", Solving the Memory Wall Problem Workshop, Vancouver, B.C., Jun. 11, 2000, pp. 1-11.

Chen, T. et al., "A Performance Study of Software and Hardware Data Prefetching Schemes", IEEE, ACM, Apr. 1994, pp. 223-232.

* cited by examiner

SOFTWARE SOLUTION FOR COOPERATIVE MEMORY-SIDE AND PROCESSOR-SIDE DATA PREFETCHING

FIELD OF THE INVENTION

Aspects of the invention relate generally to data prefetching, and more particularly, to a solution for cooperative data prefetching that enables software control of a memory-side data prefetch and/or a processor-side data prefetch.

BACKGROUND OF THE INVENTION

In computers, a memory hierarchy is typically utilized. In the memory hierarchy, multiple levels of memory are included, each having a different access latency. To this extent, memory at the lowest level has the fastest access latency while memory at the highest level has the slowest access latency. In general, the faster the memory, the more expensive it is to implement. Therefore, a lower memory level will typically have less storage space than a higher memory level. An illustrative memory hierarchy includes: very high speed machine registers; an L1 cache, which is a small amount of very fast memory located on or near a processor chip; an L2 cache, which is fast memory located adjacent to the processor; random access memory (RAM), which is dynamic memory located in the computer; a hard drive, which is relatively slow, but voluminous storage; and remote storage, which is typically used for backup, long term storage and the like. In this manner, a significant amount of storage space can be provided in a computing environment while the cost of the memory as a percentage of the overall cost of the computing environment remains reasonable.

Typically, the processing speed of the processor is approximately the same as that of the access speed of the fastest memory (e.g., L1 cache). As a result, when data is available in the fastest memory, the processor does not need to wait for the data, thereby avoiding processor stalls. However, several processing cycles can be lost when the required data is not available in the fastest memory level (i.e., a memory miss in that memory level) and therefore must be retrieved from a slower memory level (e.g., RAM). In this case, the data is copied from the slower memory to the fastest memory, where it is made available to the processor. This can result in the execution of the application pausing for several processing cycles while the data is being transferred between memory levels, degrading the application performance. In general, recent increases in the processing speed of processors have exceeded increases in the access speed of various types of memories, thereby escalating the importance of memory misses to the processing performance of the computing environment.

Numerous approaches are used that seek to reduce the frequency of memory misses and/or tolerate memory access latency. A common strategy to hide memory access latency is data prefetching. Data prefetching includes copying data from a slower memory to a faster memory, such as an L1 cache, before it is required by an application being executed. Subsequently, when the application requests the data, it will be available in the fast memory and can be processed without waiting for the data to be copied from the slower memory.

In general, data prefetching can be accomplished by software alone, hardware alone, or a combination of the two. Software-based data prefetching relies on compile-time analysis to insert and schedule explicit fetch instructions within an application. Hardware-based data prefetching employs special hardware in a computer that monitors the storage reference patterns of the application in an attempt to infer prefetching opportunities.

However, both approaches include some drawbacks. For software-based data prefetching, the inserted instructions require execution by the main processor, thereby adding to the overhead for executing the application. While hardware-based data prefetching does not require any additional instructions, it is frequently less accurate than software-based data prefetching since it relies only on execution-time information to predict data accesses, rather than on compile-time information, and therefore can detect only the simplest access patterns (i.e., constant stride). To this extent, in some approaches, a combination of software and hardware-based data prefetching is utilized to take advantage of compile-time application information to direct a hardware prefetcher, thereby reducing an overall amount of software overhead. However, these approaches are limited to data prefetching at a single level of memory, e.g., an L1 cache.

One problem with prefetching data is cache pollution, in which data that is not immediately required by the application is prefetched to a cache, causing a cache miss when the application requests other data that is required sooner. Conventional data prefetching approaches are effective at hiding latency due to cache misses for application data that is stored using regular data structures, such as an array, where memory access strides can be determined by a compiler. Similarly, using dynamic value profiling, conventional data prefetching approaches also can be effective for applications that have regular memory access strides at runtime.

However, many applications (e.g., non-numeric applications) use recursive data structures, such as linked lists, trees, graphs, and the like. These data structures employ pointers to link data nodes and form the overall data structure. At runtime, these data structures frequently have irregular memory access strides, resulting in very poor spatial data locality. As a result, the effectiveness of conventional data prefetching approaches is limited.

Some proposals seek to effectively prefetch data for irregular memory access strides. For example, some approaches sequentially prefetch pointer chains using natural pointers in the linked list. However, these approaches do not exploit any memory parallelism, limiting their effectiveness. Other approaches insert additional pointers into the linked list to connect non-consecutive link elements. In these approaches, jump pointers are inserted at compile time to create memory parallelism. However, the jump pointers increase runtime overhead and also can contribute to additional cache misses. Still other approaches seek to predict cache misses or prefetch multiple chains of pointers sequentially. However, the effectiveness of these approaches is also limited for some applications.

In view of the foregoing, a need exists to overcome one or more of the deficiencies in the related art.

BRIEF SUMMARY OF THE INVENTION

Aspects of the invention provide a solution for cooperative data prefetching that enables software control of a memory-side data prefetch (e.g., a long distance, coarse-grain data prefetch) and a processor-side data prefetch (e.g., a short distance, fine-grain data prefetch). In one embodiment, the invention provides a solution for generating an application, in which access to application data for the application is improved (e.g., optimized) in program code for the application. In particular, a push request, for performing a memory-side data prefetch of the application data, and a prefetch request, for performing a processor-side data prefetch, are added to the program code. The memory-side data prefetch results in the application data being copied from a first data store to a second data store that is faster than the first data store while the processor-side data prefetch results in the application data being copied from the second data store to a third data store that is faster than the second data store. In another embodiment, the invention provides a solution for executing an application, in which the memory-side data prefetch is performed using at least one of: a near memory processor or a memory controller in response to a push request in the application. In still another embodiment, the invention provides an application that enables a computer system to perform the memory-side data prefetch and the processor-side data prefetch after the memory-side data prefetch for some or all of the same application data. In this manner, aspects of the invention provide a solution for performing a memory-side prefetch under control of the application, which is inserted based on compile time information, thereby reducing a likelihood of memory misses, cache pollution, and/or the like.

A first aspect of the invention provides a method of generating an application, the method comprising: improving access to application data for the application in program code for the application, the improving including: adding a push request for a memory-side data prefetch to the program code, wherein the memory-side data prefetch causes an execution environment to copy the application data from a first data store to a second data store that is faster than the first data store; and adding a prefetch request for a processor-side data prefetch to the program code, wherein the processor-side data prefetch causes the execution environment to copy the application data from the second data store to a third data store that is faster than the second data store, and wherein the push request and the prefetch request cooperate to hide a memory access latency for the application data.

A second aspect of the invention provides a system for generating an application, the system comprising: a system for improving access to application data for the application in program code for the application, the system for improving including: a system for adding a push request for a memory-side data prefetch to the program code, wherein the memory-side data prefetch causes an execution environment to copy the application data from a first data store to a second data store that is faster than the first data store; and a system for adding a prefetch request for a processor-side data prefetch to the program code, wherein the processor-side data prefetch causes the execution environment to copy the application data from the second data store to a third data store that is faster than the second data store, and wherein the push request and the prefetch request cooperate to hide a memory access latency for the application data.

A third aspect of the invention provides a computer program product comprising program code stored on at least one computer-readable medium, which when executed, enables a computer system to implement a method of generating an application, the method comprising: improving access to application data for the application in program code for the application, the improving including: adding a push request for a memory-side data prefetch to the program code, wherein the memory-side data prefetch causes an execution environment to copy the application data from a first data store to a second data store that is faster than the first data store; and adding a prefetch request for a processor-side data prefetch to the program code, wherein the processor-side data prefetch causes the execution environment to copy the application data from the second data store to a third data store that is faster than the second data store, and wherein the push request and the prefetch request cooperate to hide a memory access latency for the application data.

A fourth aspect of the invention provides a method of generating a system for generating an application, the method comprising: providing a computer system operable to: improve access to application data for the application in program code for the application, the improving including: adding a push request for a memory-side data prefetch to the program code, wherein the memory-side data prefetch causes an execution environment to copy the application data from a first data store to a second data store that is faster than the first data store; and adding a prefetch request for a processor-side data prefetch to the program code, wherein the processor-side data prefetch causes the execution environment to copy the application data from the second data store to a third data store that is faster than the second data store, and wherein the push request and the prefetch request cooperate to hide a memory access latency for the application data.

A fifth aspect of the invention provides a method of executing an application, the method comprising: executing a program in response to a push request in the application using at least one of: a near memory processor or a memory controller, wherein the program copies application data for the application from a first data store to a second data store that is faster than the first data store; and performing a processor-side data prefetch after the memory-side data prefetch, wherein the processor-side data prefetch copies the application data from the second data store to a third data store that is faster than the second data store.

A sixth aspect of the invention provides a system for executing an application, the system comprising: a memory hierarchy that includes a first data store and a second data store that is faster than the first data store; and a system for separately executing a program in response to a push request in the application, wherein the program copies application data for the application from the first data store to the second data store.

A seventh aspect of the invention provides a method of generating a system for executing an application, the method comprising: providing a computer system operable to: execute a program in response to a push request in the application using at least one of: a near memory processor or a memory controller, wherein the program copies application data for the application from a first data store to a second data store that is faster than the first data store; and perform a processor-side data prefetch after the memory-side data prefetch, wherein the processor-side data prefetch copies the application data from the second data store to a third data store that is faster than the second data store.

An eighth aspect of the invention provides a computer program product comprising program code stored on at least one computer-readable medium, which when executed, enables a computer system to implement the following: execute a program using at least one of: a near memory processor or a memory controller, wherein the program copies application data from a first data store to a second data store that is faster than the first data store; and perform a processor-side data prefetch, wherein the processor-side data prefetch copies the application data from the second data store to a third data store that is faster than the second data store.

A ninth aspect of the invention provides a business method for generating and/or executing an application, the business method comprising managing a computer system that performs the generation and/or execution processes described herein; and receiving payment based on the managing.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As used herein, unless otherwise noted, the term "set" means one or more (i.e., at least one) and the phrase "any solution" means any now known or later developed solution. Additionally, the term "data store" means any type of memory, storage device, storage system, and/or the like, which can temporarily or permanently store electronic data, and which can be included in a storage and/or memory hierarchy (collectively referred to herein as a "memory hierarchy") for a computer system. Further, it is understood that use of the terms "optimize", "optimization", and derivatives thereof does not limit the invention to improving access to application data, the execution of an application, and/or the like to the maximum extent possible, but rather includes making such improvements to any desired and/or practical level. For convenience, the following headers are included:

I. Overview
II. Illustrative Development Environment
III. Illustrative Execution Environment
IV. Application Examples
V. Alternatives

I. OVERVIEW

As indicated above, aspects of the invention provide a solution for cooperative data prefetching that enables software control of a memory-side data prefetch (e.g., a long distance, coarse-grain data prefetch) and a processor-side data prefetch (e.g., a short distance, fine-grain data prefetch). In one embodiment, the invention provides a solution for generating an application, in which access to application data for the application is improved (e.g., optimized) in program code for the application. In particular, a push request, for performing a memory-side data prefetch of the application data, and a prefetch request, for performing a processor-side data prefetch, are added to the program code. The memory-side data prefetch results in the application data being copied from a first data store to a second data store that is faster than the first data store while the processor-side data prefetch results in the application data being copied from the second data store to a third data store that is faster than the second data store. In another embodiment, the invention provides a solution for executing an application, in which the memory-side data prefetch is performed using at least one of: a near memory processor or a memory controller in response to a push request in the application. In still another embodiment, the invention provides an application that enables a computer system to perform the memory-side data prefetch and the processor-side data prefetch after the memory-side data prefetch for some or all of the same application data. In this manner, aspects of the invention provide a solution for performing a memory-side prefetch under control of the application, which is inserted based on compile time information, thereby reducing a likelihood of memory misses, cache pollution, and/or the like.

Figure 1:
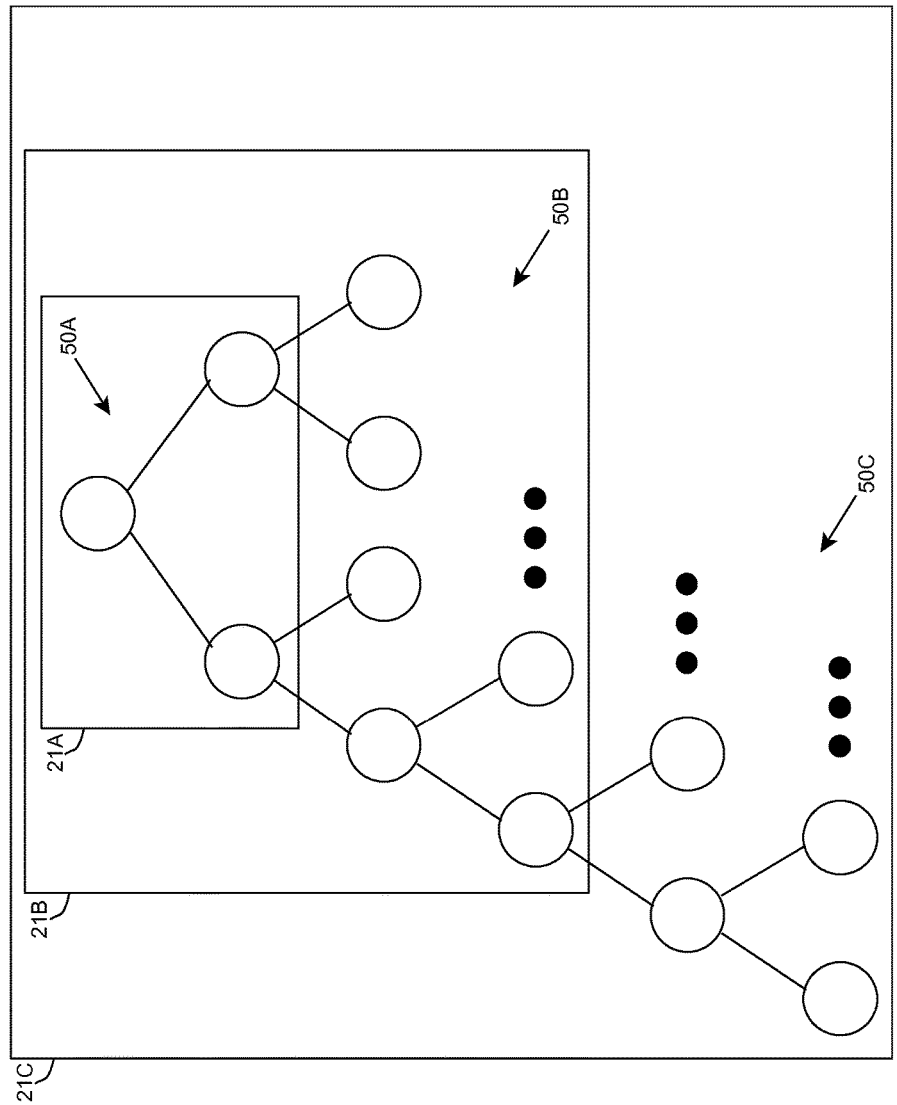
FIG. 1 shows an illustrative configuration for storing application data according to an embodiment of the invention.

Turning to the drawings, FIG. 1 shows an illustrative configuration for storing application data according to an embodiment of the invention. In general, aspects of the invention provide a solution for managing application data 50A-C stored in a hierarchical memory 21A-C. In particular, hierarchical memory 21A-C is shown including three levels of memory 21A-C, although any number of levels of memory can be included. Memory 21C comprises a relatively slow memory with a relatively large storage space, memory 21B comprises a faster memory that has a smaller storage space, and memory 21A comprises the fastest memory, but has the smallest storage space. In one embodiment, memory 21C comprises RAM, memory 21B comprises an L2 cache, and memory 21A comprises an L1 cache. However, it is understood that memories 21A-C can comprise any type of memory in any portion of the memory hierarchy, in which memory 21A is in some sense (e.g., access latency) more valuable than memory 21B, which in turn is in some sense more valuable than memory 21C.

Application data 50A being accessed by an application at a point in time is stored in the fastest memory 21A. If the requested application data 50A-C is not present in memory 21A (i.e., a memory miss), the execution environment copies it "closer" to the processor. That is, the execution environment copies application data 50A from a slower memory 21B-C to memory 21A for access/processing by the application. However, copying application data 50A-C from a slower memory 21B-C to a faster memory 21A can require multiple processing cycles to complete. As a result, if application data 50A is not available in memory 21A when requested, the application will need to pause to wait for application data 50A to be copied to memory 21A. Typically, copying application data 50C from memory 21C to memory 21A requires more time (e.g., processing cycles) than copying application data 50B from memory 21B to memory 21A.

An aspect of the invention provides a solution that seeks to reduce the number of times that application data 50A is not available in memory 21A when requested by an application, thereby hiding any memory access latency. To this extent, this aspect of the invention provides a solution in which application data 50C that is identified as likely to generate a memory miss is first copied from memory 21C to memory 21B for storage as application data 50B, and subsequently copied from memory 21B to memory 21A for storage as application data 50A prior to being requested by the application. An aspect of the invention uses a memory-side data prefetch included in the application to copy some or all of application data 50C for storage in memory 21B several processing cycles in advance of a possible request. In one embodiment, the memory-side data prefetch is processed by near memory processor (NMP) or the like. In this case, since the main processor does not process the memory-side data prefetch, the execution of the application is not delayed due to the memory-side data prefetch operation. Subsequently, a processor-side data prefetch can be included in the application to copy some or all of application data 50B for storage in memory 21A a few processing cycles in advance of a request. In one embodiment, a cache line touch instruction is used to copy some or all of application data 50B to application data 50A, however, a prefetch engine, or the like, could be used.

The memory-side data prefetch and processor-side data prefetch can be included in the application in a cooperative manner. In particular, the memory-side data prefetch can be inserted in a location of the application that enables the processor-side data prefetch to be inserted relatively close to the request, since the application data will be present in a lower memory level due to the memory-side data prefetch. Additionally, since memory-side data prefetching has a higher capability of tolerating mis-predictions (e.g., due to the larger storage space), more aggressive long distance data can be pushed into lower memory levels closer to the processor to reduce the memory latency (e.g., coarse-grain prefetching). When performed by an NMP or the like, the data can be copied without overhead from additional instructions and/or additional application data required in other approaches, such as the use of a jump-pointer. Additionally, compile-time identification and replication of data structures translated by the NMP can be used to facilitate memory (e.g., cache) efficient access and implied prefetch during translation. During the memory-side data prefetch, a translation lookaside buffer (TLB) prefetch also is implied.

The processor-side data prefetch reacts faster, but is more speed and resource constrained. As a result, the processor-side data prefetch has a lower capability of tolerating a mis-prediction. To this extent, the processor-side data prefetch can be used to copy conservative short distance data to bring critical application data into the fastest memory 21A (e.g., fine-grain prefetching). In this manner, an aspect of the invention provides a solution that uses cooperative memory-side (coarse-grain) and processor-side (fine-grain) data prefetching, which can effectively hide memory latency with low overhead for various data reference patterns, including irregular data reference patterns.

II. ILLUSTRATIVE DEVELOPMENT ENVIRONMENT

Figure 2:
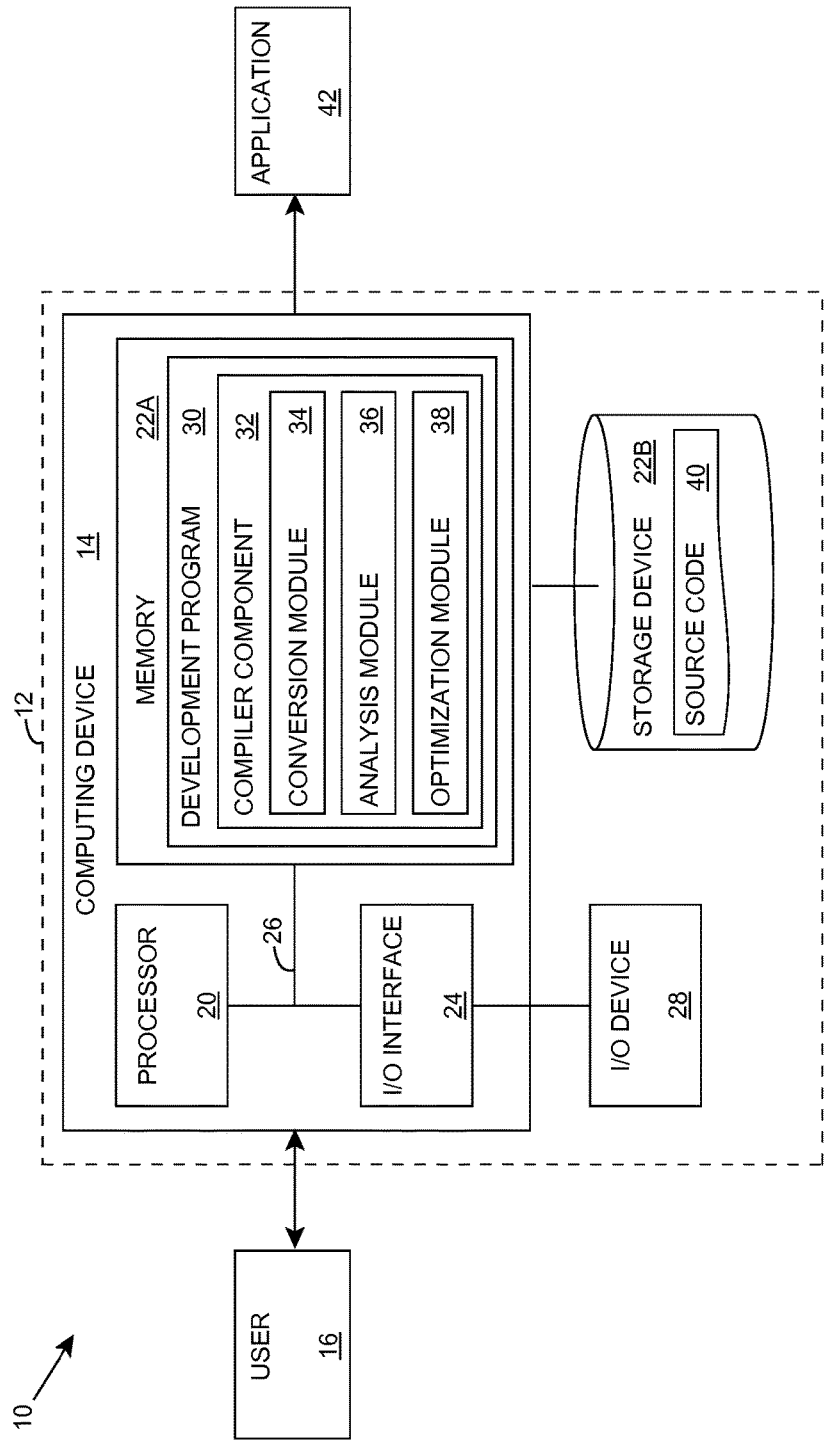
FIG. 2 shows an illustrative environment for developing an application according to an embodiment of the invention.

FIG. 2 shows an illustrative environment 10 for developing an application 42 according to an embodiment of an aspect of the invention. To this extent, environment 10 includes a computer system 12 that can perform the process described herein in order to generate application 42. In particular, computer system 12 is shown including a computing device 14 that comprises a development program 30, which makes computing device 14 operable to generate application 42 by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as development program 30, which is stored in a storage system, such as memory 22A and/or storage device 22B. While executing program code, processor 20 can read and/or write data, such as source code 40, to/from memory 22A, storage device 22B, and/or I/O interface 24. Bus 26 provides a communications link between each of the components in computing device 14. I/O device 28 can comprise any device that transfers information between a user 16 and computing device 14. To this extent, I/O device 28 can comprise a user I/O device to enable an individual user 16 to interact with computing device 14 and/or a communications device to enable a system user 16 to communicate with computing device 14 using any type of communications link.

In any event, computing device 14 can comprise any general purpose computing article of manufacture capable of executing program code installed thereon. However, it is understood that computing device 14 and development program 30 are only representative of various possible equivalent computing devices that may perform the process described herein. To this extent, in other embodiments, the functionality provided by computing device 14 and development program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, development program 30 enables computer system 12 to generate application 42 based on source code 40. In general, source code 40 comprises data that defines application 42 in a human-readable format. To this extent, user 16 can use development program 30 to manage source code 40 using any solution (e.g., via user interface(s), an Application Program Interface (API), and/or the like). For example, development program 30 can comprise some or all of an Integrated Development Environment (IDE), a tooling framework, and/or the like.

In any event, application 42 comprises program code that is in a machine-readable format, which can be executed by a computer system. Consequently, development program 30 is shown including a compiler component 32 that makes computer system 12 operable to generate application 42 based on source code 40. In particular, compiler component 32 obtains source code 40 and translates it into program code that is executable by a computer system. It is understood that compiler component 32 can use a set of additional resources, such as a library, to generate application 42. Further, it is understood that source code 40 and application 42 can be stored in storage device 22B using any solution, such as one or more files.

In order to generate application 42, compiler component 32 is shown including a conversion module 34, an analysis module 36, and an optimization module 38. Operation of each of these modules is discussed further herein. However, it is understood that some of the various modules shown in FIG. 2 can be implemented independently, combined, and/or stored in memory of one or more separate computing devices that are included in computer system 12. Further, it is understood that compiler component 32 could be implemented apart from development program 30. Still further, it is understood that some of the modules and/or functionality may not be implemented, or additional modules and/or functionality may be included as part of computer system 12.

Figure 3:
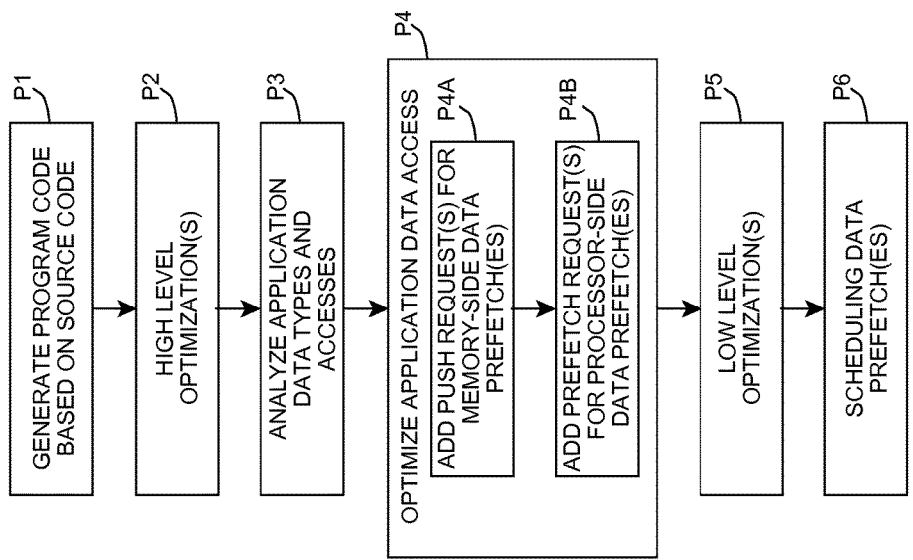
FIG. 3 shows an illustrative process flow diagram for generating an application according to an embodiment of the invention.

Regardless, in one embodiment, the invention provides a solution for generating application 42. To this extent, FIG. 3 shows an illustrative process flow diagram for generating application 42, which can be implemented by computer system 12 (FIG. 2), according to an embodiment of the invention. Referring to FIGS. 2 and 3, in process P1, conversion module 34 generates program code for application 42 based on source code 40. To this extent, conversion module 34 translates source code 40 into program code, which is stored as application 42. Additionally, conversion module 34 can translate additional source code and/or obtain additional program code, which is included in application 42.

Subsequently, in process P2, optimization module 38 performs a set of high level optimizations on the program code for application 42. The set of high level optimizations can include, for example, loop transformation(s), application data remapping, and/or the like, to optimize the locality of application data.

In process P3, analysis module 36 analyzes application data types and accesses in the program code for application 42. In particular, analysis module 36 can identify application data reference(s) in the program code for application 42 and the corresponding application data that are most likely to incur a memory (cache) miss. Further, analysis module 36 can identify various attributes of the application data. Analysis module 36 can use various types of analyses to identify the application data reference(s), corresponding application data, and/or application data attributes.

Figure 4:
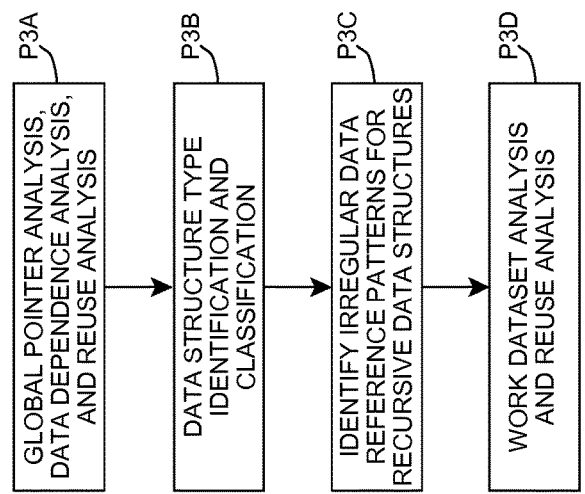
FIG. 4 shows an illustrative process flow diagram for analyzing application data according to an embodiment of the invention.

To this extent, FIG. 4 shows an illustrative process flow diagram for analyzing application data according to an embodiment of the invention. In process P3A, analysis module 36 (FIG. 2) performs various static analyses on the application data, such as global pointer analysis, reuse analysis, and the like. Further, analysis module 36 performs data dependence analysis. In general, dependence is a relation between two statements in program code. In particular, a first statement depends on a second statement, or there is a data dependence from a first statement to the second statement, if and only if: (a) both statements access the same memory location; and (b) there is a possible run-time execution path from the first statement to the second statement. Data dependence analysis determines whether different program code fragments access the same or different memory locations. Using these analyses, analysis module 36 can determine if the program code can be transformed or made to reuse application data in registers and/or a cache more frequently. Further, using data dependence analysis and/or idiom transformations, analysis module 36 can identify irregular memory access patterns for recursive data structures.

In process P3B, analysis module 36 (FIG. 2) identifies and/or classifies various data structure types used in the application data. In particular, analysis module 36 can identify arrays, recursive data structures, streams, and/or the like. Further, analysis module 36 can classify a particular data structure into one of a plurality of sub-types. For example, a stream comprises a sequence of addresses for application data that depend on an inner loop induction variable with a constant stride. In general, streams can be classified into several sub-types. To this extent, a "load stream" includes at least one load, while a "store stream" does not include any loads. Further, an "indexed stream" is accessed indirectly through another load stream. Still further, a "strided stream" has a stride that is either unknown or a constant that is larger than a line size of the fastest memory (e.g., L1 cache). Analysis module 36 can identify streams in application data and classify the identified streams using any solution.

In process P3C, analysis module 36 (FIG. 2) identifies irregular data reference patterns for recursive data structures. To this extent, analysis module 36 can perform dynamic value profiling to gather memory reference address, range, and density information with respect to the application data. Further, analysis module 36 can perform memory reference value profiling. Using memory reference value profiling, analysis module 36 can obtain information about address ranges and access density for the application data. Further, analysis module 36 can obtain information regarding memory access strides, repeatable access patterns, and/or the like. In process P3D, analysis module 36 can perform work dataset analysis, reuse analysis, and/or the like, to obtain additional information on the application data.

Returning to FIGS. 2 and 3, in process P4, optimization module 38 uses the information on the application data and application 42 to improve access to the application data in application 42. In general, accesses to application data in a typical application 42 have both spatial locality, which means that a memory location near an accessed memory location is likely to be accessed in the near future, and temporal locality, which means that the accessed memory location is likely to be accessed again in the near future. However, access to application data stored in certain data structures frequently has a poor temporal and/or spatial locality. Optimization module 38 can use an understanding of the locality for particular methods and/or structures used in accessing application data together with the information on the application data to improve one or more accesses to the application data. In particular, optimization module 38 can improve access for one or more application data references in application 42 that are identified as likely to generate a memory miss by inserting cooperative memory-side and processor-side data prefetch requests.

For each application data reference that is identified as likely to generate a memory miss, in process P4A, optimization module 38 adds a push request for a memory-side data prefetch to the program code for application 42. In general, the memory-side data prefetch causes an execution environment to copy the specified application data from a first data store to a second data store that is faster than the first data store, e.g., the application data is moved closer to the processor in the memory hierarchy. In one embodiment, the application data is copied from RAM, an L3 cache, and/or the like, to an L2 cache. Optimization module 38 selects a location in the program code for the memory-side data prefetch based on a location of a corresponding reference to the application data in the program code. In particular, optimization module 38 can insert the memory-side data prefetch at least N operations before the reference, where N is the number of operations that the memory-side data prefetch will require to complete (e.g., ten to twenty operations).

Optimization module 38 can add one of a plurality of types of push requests based on one or more attributes of the corresponding application data and/or accesses to the application data. For example, when the data reference is part of a group of data references that access a high density of memory addresses with short address ranges relative to a size of the destination data store (e.g., the L2 cache), then the push request can comprise a block data prefetch for copying the application data. Conversely, when the data reference is part of a group of data references that access a sequence of memory addresses in the application data that have a semi-constant stride (e.g., a regular stride pattern for which most strides are constant) at runtime, then the push request can comprise an irregular data prefetch for copying the application data. For example, the irregular data prefetch can traverse at least a portion of a recursive data structure (e.g., a tree such as that shown in FIG. 1) in a specified manner and copy the application data for the traversed portion. The block and irregular data prefetches are discussed further herein.

In any event, in process P4B, optimization module 38 also adds a prefetch request for a processor-side data prefetch to the program code for application 42 for each application data reference that is identified as likely to generate a memory miss. In general, the processor-side data prefetch causes an execution environment to copy the specified application data from the second data store to a third data store that is faster than the second data store, e.g., the application data is moved closer to the processor in the memory hierarchy. In one embodiment, the application data is copied from the L2 cache to the L1 cache. Optimization module 38 selects a location in the program code for the processor-side data prefetch based on a location of a corresponding reference to the application data in the program code. In particular, optimization module 38 can insert the processor-side data prefetch at least P operations before the reference, where P is the number of operations that the processor-side data prefetch will require to complete (e.g., a few operations).

To this extent, the location of the memory-side data prefetch can be selected such that it is at least N+P operations before the reference, so that the memory-side data prefetch will have completed before the processor-side data prefetch is performed. Since the application data being moved in the processor-side data prefetch has already been copied to a faster memory using the memory-side data prefetch, the location of the processor-side data prefetch can be selected to be very close to the reference, thereby reducing a likelihood that the prefetched data will be swapped out of the memory and/or cause a memory miss for other application data. In this manner, the memory-side data prefetch and processor-side data prefetch cooperate to hide memory access latency for the application data. In any event, in process P4, optimization module 38 can repeat processes P4A-B for each application data reference that is identified as likely to generate a memory miss.

In process P5, optimization module 38 can perform a set of low level optimizations. For example, optimization module 38 can perform commoning, value numbering, reassociation, and/or the like, on the program code for application 42. Similarly, in process P6, optimization module 38 can adjust the scheduling of one or more of the processor-side data prefetches. For example, optimization module 38 can attempt to use an empty execution slot to schedule a processor-side data prefetch, thereby reducing the overhead of the optimization(s). It is understood that one or more of the various processes P1-6 can be performed in a different order, performed simultaneously with another process, and/or not implemented. Further, additional analyses and/or optimizations not expressly discussed herein can be implemented. To this extent, in one embodiment, some or all of the various analyses and/or optimizations discussed herein can be selectively enabled/disabled by a user 16 using any solution (e.g., flags).

III. ILLUSTRATIVE EXECUTION ENVIRONMENT

Figure 5:
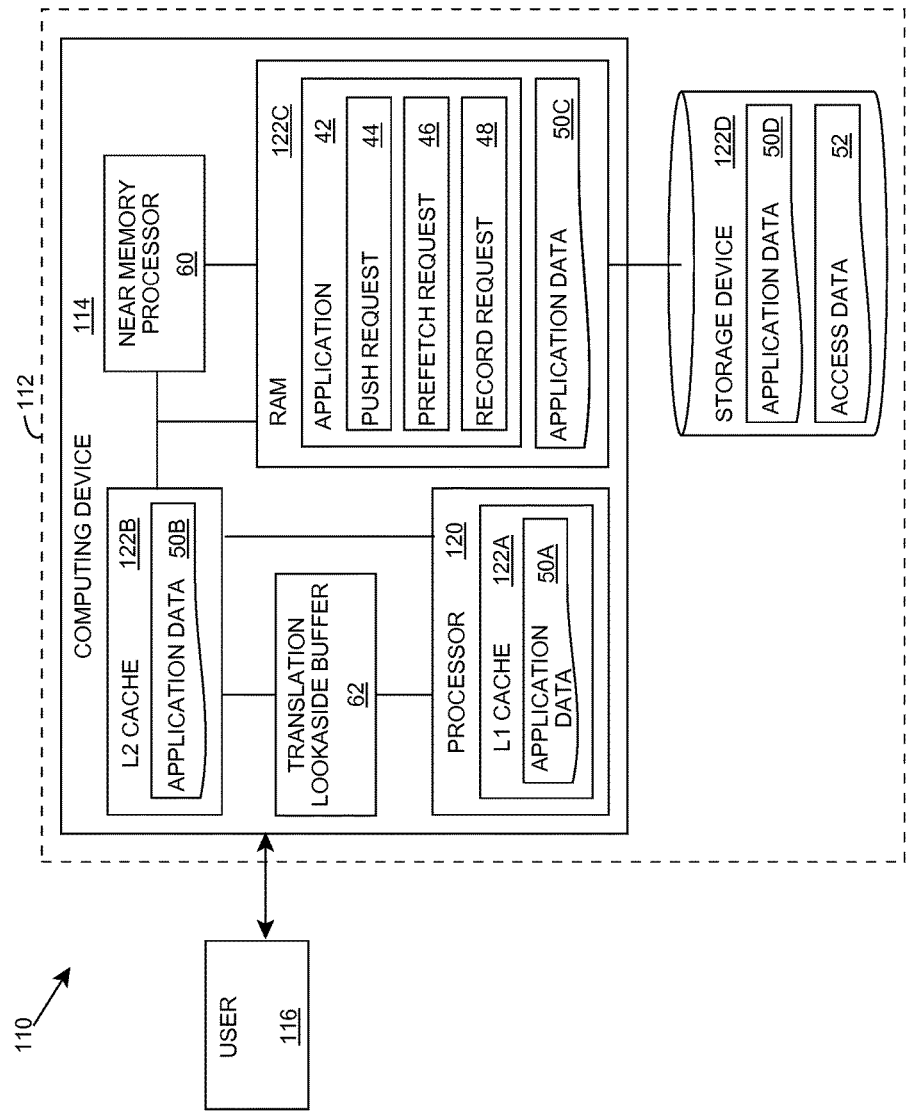
FIG. 5 shows an illustrative execution environment for an application according to an embodiment of the invention.

Once compiler component 32 has generated application 42 (e.g., translated source code 40 and performed the selected optimization(s)), application 42 can be executed by a computer system. To this extent, FIG. 5 shows an illustrative execution environment 110 for application 42 according to an embodiment of the invention. In particular, environment 110 is shown including a computer system 112, which includes one or more computing devices 114 that are capable of executing application 42. However, it is understood that computer system 112 and computing device 114 are only illustrative of various configurations as discussed herein with respect to environment 10 (FIG. 2).

Computing device 114 is shown including a processor 120, an L1 cache 122A included within processor 120, an L2 cache 122B, a RAM 122C, and is shown in communication with a storage device 122D. A memory hierarchy for computer system 112 includes the various types of data stores 122A-D. In particular, with respect to data stores 122A-D, L1 cache 122A is the lowest memory, L2 cache 122B is the second lowest memory, RAM 122C is the third lowest memory, and storage device 122D is the highest memory. In general, the access speed of each data store 122A-D increases from highest to lowest, while an amount of storage space increases from lowest to highest.

Further, computing device 114 is shown including a near memory processor 60. An embodiment of the invention provides a near memory processor 60 and/or a memory controller, which supports executing a program in response to a push request 44, which is included in an application 42. Further, an embodiment of the invention provides a computing device 114 and/or computer system 112, which includes such a near memory processor 60 and/or memory controller. In any event, it is understood that computing device 114 can include additional component(s), however, these components are not shown in FIG. 5 for clarity.

Computing device 114 can execute application 42 with or without interaction from a user 116. While executing application 42, application data 50A-D can be stored in each of the levels of the memory hierarchy. For example, storage device 122D can store application data 50D in a file in a file system or the like. During execution, application 42 can access and/or modify application data 50D causing a copy of the application data 50C to be stored in RAM 122C. Further, application 42 may generate and manage additional temporary application data 50C that is also stored in RAM 122C.

Caches 122A-B store copies of application data 50A-B that have been/will be processed by processor 120 in the short term. To this extent, in one embodiment of the invention, application 42 includes a push request 44. During execution, push request 44 causes near memory processor 60 to execute a program that performs a memory-side data prefetch. In particular, near memory processor 60 will copy the designated application data 50C from RAM 122C to L2 cache 122B for storage as application data 50B. The program can comprise a preconfigured program available on near memory processor 60 and/or can comprise a custom program that is provided to near memory processor 60 in response to the push request. In an alternative embodiment, computing device 114 can include a memory controller, which performs the memory-side data prefetch rather than near memory processor 60.

Regardless, subsequently, processor 120 will execute a prefetch request 46 in application 42, which performs a processor-side data prefetch. In particular, processor 120 will copy the designated application data 50B from L2 cache 122B to L1 cache 122A for storage as application data 50A. Afterward, processor 120 will process an operation in application 42 that accesses application data 50A. In this manner, application data 50A is already available in L1 cache 122A prior to being accessed by application 42. It is understood that prefetch request 46 may be executed multiple times (e.g., within a loop) subsequent to a push request 44. For example, push request 44 can copy a relatively large amount of application data 50C to L2 cache 122B, and each subsequent prefetch request 46 can copy a relatively small amount of application data 50B to L1 cache 122A.

During execution of application 42, computing device 114 can perform various additional operations. For example, as a result of a memory-side data prefetch, information in a translation lookaside buffer (TLB) 62 can be updated. In particular, TLB 62 includes a mapping of virtual addresses to physical addresses that are stored in L2 cache 122B. When the contents of L2 cache 122B are modified due to the memory-side data prefetch, the contents of TLB 62 are also modified to reflect the new mapping. As a result, processor 120 will receive a TLB 62 hit when an address for application data 50B is requested from TLB 62.

Additionally, application 42 can include one or more record requests 48. Near memory processor 60 (or a memory controller) can process each record request 48 and record a set of access patterns for some or all of application data 50A-D as access data 52. Subsequently, analysis module 36 (FIG. 2) can analyze the recorded access data 52 and identify any repeatable access patterns and/or the like (e.g., in process P3 of FIG. 3), which can be used by optimization module 38 (FIG. 2) to improve access to application data 50A-D. Optimization module 38 can add the record request(s) 48 to application 42 when no access data 52 is available for analysis (e.g., in process P4 of FIG. 3).

IV. APPLICATION EXAMPLES

In any event, an embodiment of the invention provides an application 42 that includes a push request 44 for a memory-side data prefetch and a corresponding prefetch request 46 for processor-side data prefetch. The processing of push request 44 and prefetch request 46 during execution of application 42 helps cause application data 50A to be present in L1 cache 122A when accessed by one or more operations in application 42.

In one embodiment, the push request 44 causes the execution of a program that implements the designated push request 44 by a separate thread from the main execution thread for application 42. In particular, the separate thread can be started on a near memory processor 60 and/or a memory controller to execute the program corresponding to the push request 44. Near memory processor 60 and/or a memory controller can support a plurality of types of preconfigured push requests 44. Further, a push request 44 can comprise various configuration options. In one embodiment, two types of preconfigured push requests 44 are provided, a block data prefetch and an irregular data prefetch. An illustrative interface for the block data prefetch can comprise:

```
void __block_data_prefetch(void * startAddress,
                          unsigned int stride,
                          unsigned int blockSize,
                          unsigned int direction,
                          unsigned int controlFlags);
``` in which: startAddress is a start address of a block of application data 50C; stride is the stride to be used; blockSize is the total size of a block of application data 50C (e.g., in bytes); direction designates either forward or backward for the stride; and controlFlags enables specification of various control information. When processed by near memory processor 60, for example, the block data prefetch will cause application data 50C of the designated block size to be copied to L2 cache 122B starting at the startAddress and using the designated stride in the designated direction.

Further, an illustrative interface for the irregular data prefetch can comprise:

```
void __irregular_data_prefetch (void * rootNodeAddress,
                               unsigned int prefetchDepth,
                               unsigned int prefetchType,
                               unsigned int nodeSize,
                               unsigned int numberOfSuccessors,
                               unsigned offsetForSuccessorPointer1, ...);
``` in which: the rootNodeAddress is the start address of a recursive data structure, such as the first node of a linked list, root node of a tree, and/or the like; the prefetchDepth comprises a depth of the prefetching (e.g., zero can be used to designate no control); prefetchType designates a type of prefetch operation, e.g., linked list, depth first, width first, and/or the like; nodeSize is a size of each node, numberOfSuccessors, is a number of successors for the first node; and offsetForSuccessorPointer1, . . . is an offset of the pointer field for each successor. When processed by near memory processor 60, for example, the irregular data prefetch will cause application data 50C starting with a node of the designated node size at the designated rootNodeAddress to be copied to L2 cache 122B using the designated prefetchtype and for the designated prefetchDepth. This process is repeated for each designated successor. In this manner, near memory processor 60 can walk/traverse some or all of an irregular data structure, prefetching the corresponding data.

For certain types of data access patterns, neither of the preconfigured push requests 44 may provide an optimal performance. In this case, optimization module 38 can generate a custom push request 44 that comprises a custom program that is executed by, for example, near memory processor 60. For example, optimization module 38 can derive the custom program from source code 40 (FIG. 1) and/or application 42 that is accessing the data. The custom program can be configured to execute the push request 44 in a manner that provides an improved/optimal performance for the particular data access pattern using any solution. To this extent, near memory processor 60 can support a programming language and interface that enables optimization module 38 to define the custom program, which is executed by near memory processor 60 when the push request 44 is encountered during the execution of application 42. The custom program can implement any solution for managing application data 50B-C within the corresponding memory levels 122B-C.

Various benefits of aspects of the present invention are further discussed in conjunction with several illustrative examples of program code for application 42, which are described in conjunction with various illustrative aspects of generating the program code with compiler component 32 (FIG. 2). While shown and discussed in pseudo/source code, it is understood that the program code can comprise operations that are executable by a processor, rather than the pseudo/source code shown herein for clarity. In a first example, application 42 comprises:

```
for (i=0; i < N; i++) {
    ptr = a[i];
    __irregular_data_prefetch(ptr, UNLIMITED, LINK_LIST,
                sizeof(node), offsetOfNext);
    while (ptr) {
        __dcbt(ptr->next);
        Computation;
        Ptr = ptr -> next;
    }
}
```

In this example, optimization module 38 (FIG. 2) adds an irregular data prefetch to push application data 50C to L2 cache 122B in advance of pointer-chasing code that traverses a linked list of nodes, which frequently has poor data locality. Additionally, optimization module 38 adds a cache line touch instruction, _dcbt( ), to prefetch application data 50B from L2 cache 122B for storage in L1 cache 122A prior to its subsequent reference after the computation.

In some applications, access to application data 50C may show a regular semi-constant stride pattern at runtime (e.g., which analysis module 36 (FIG. 2) can determine based on access data 52). As a result, a stride data prefetch can be used. To this extent, a second example of application 42 comprises pseudo code for implementing a balanced tree (B-tree) search:

```
void BTTableClass::Check(void) {
    KeyFieldType Last;
    Last[0] = '*';
    Last[1] = NULLCHAR;
    __irregular_data_prefetch(Root, DEPTH, DEPTH_FIRST,
        sizeof(NodeType), (sizeof(int)+sizeof(Key[MaxKeys])),
        (sizeof(int)+sizeof(Key[MaxKeys]) + sizeof(long)),
        (sizeof(int)+sizeof(Key[MaxKeys]) + 2*sizeof(long)));
    CheckSubtree(Root, Last);
}
void BTTableClass::CheckSubtree(long Current,
                    KeyFieldType & Last) {
    NodeType Node;
    int k;
    if (Current == NilPtr)
        return;
    for (k = 0; k < Node.Count; k++){
        __dcbt(Node.Branch[k]);
    }
    DataFile.seekg(Current * NodeSize, ios::beg);
    DataFile.read(reinterpret_cast <char *> (&Node),
                NodeSize);
    for (k = 0; k < Node.Count; k++) {
        CheckSubtree(Node.Branch[k], Last);
        if ((Last[0] != '*') && (strcmp(Last,
            Node.Key[k].KeyField) >= 0)) {
            cout << "Check has found a problem in node " <<
                Current << " index " << k << " key " <<
                Node.Key[k].KeyField << endl;
            Dump( );
            exit(1);
        }
        strcpy(Last, Node.Key[k].KeyField);
    }
    CheckSubtree(Node.Branch[Node.Count], Last);
}
```

In this example, optimization module 38 (FIG. 2) adds the stride data prefetch (implemented using the irregular data prefetch and a corresponding set of configuration options) to the main function BTTableClass::Check( ) to prefetch the B-tree (application data 50C) into L2 cache 122B, and adds a cache line touch instruction with a corresponding loop to the BTTableClass::CheckSubtree( ) function to prefetch the nodes of a particular subtree prior to a subsequent loop in the function that accesses the subtree. In this manner, the entire tree is aggressively pushed into L2 cache 122B, while only a branch being processed is prefetched into L1 cache 122A.

Using dynamic profiling information, analysis module 36 (FIG. 2) can determine when an address range for a recursive data structure comprises a high density within a fixed, relatively small range with respect to a size of L2 cache 122B. In this case, optimization module 38 (FIG. 2) can add a block data prefetch rather than an irregular data prefetch, which can be used without the dynamic profiling information. To this extent, a third example comprises:

```
__block_data_prefetch(b, 1, sizeof(b), FORWARD, KEEP);
...
for (i=0; i<N; i++) {
    __dcbt( b[ a[i+ahead] ] );
    ... = ... b[ a[i] ];
}
/* some code here with immediate use of b */
```

In this example, optimization module 38 adds a cache line touch instruction within the loop body to prefetch a subsequent item of the indexed stream. The number of item(s) ahead can be selected based on a total number of cycles in the loop body, an L1 cache 122A miss penalty and/or the like. Optimization module 38 adds the block data prefetch prior to the loop to help ensure that all the relevant application data 50B is stored in L2 cache 122B. It is understood that such an optimization is particularly effective when application 42 includes an immediate reuse of the array b after the loop as shown. When there is no immediate reuse, another optimization solution, such as data remapping, may be more effective and therefore utilized by optimization module 38. Further, optimization module 38 can use access data 52, such as extended dynamic profile information gathered by runtime hardware performance counters or the like, to add irregular data prefetches for memory accesses that incur memory misses.

Similarly, using compiler analysis, analysis module 36 (FIG. 2) can determine that some irregular memory reference accesses (e.g., using a recursive data structure) are associated with statically or dynamically allocated storage having a size much smaller than a size of L2 cache 122B. For example, in some applications, a large memory pool is pre-allocated and individual nodes are dynamically allocated from the pool. Pointers link the individual nodes to form the overall data structure. In this case, optimization module 38 (FIG. 2) can add an aggressive block data prefetch to push application data 50C into a lower memory level 122B.

V. ALTERNATIVES

While shown and described herein as methods and systems for generating and/or executing an application and the application, it is understood that the invention further provides various alternative embodiments. For example, in one embodiment, the invention provides a computer program stored on at least one computer-readable medium, which when executed, enables a computer system to generate an application. To this extent, the computer-readable medium includes program code, such as development program 30 (FIG. 2), which implements the process described herein. It is understood that the term "computer-readable medium" comprises one or more of any type of tangible medium of expression (e.g., physical embodiment) capable of embodying a copy of the program code. In particular, the computer-readable medium can comprise program code embodied on one or more portable storage articles of manufacture, on one or more data storage portions of a computing device, such as memory 22A (FIG. 2) and/or storage system 22B (FIG. 2), as a data signal traveling over a network (e.g., during a wired/wireless electronic distribution of the computer program), on paper (e.g., capable of being scanned and converted to electronic data), and/or the like.

In another embodiment, the invention provides a method of generating a system for generating an application. In this case, a computer system, such as computer system 12 (FIG. 2), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 2), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that performs the generation and/or execution processes described herein on a subscription, advertising, and/or fee basis. That is, a service provider could offer to generate an application and/or execute the application as described herein. In either case, the service provider can manage (e.g., create, maintain, support, etc.) a computer system, such as computer system 12 (FIG. 2) or computer system 112 (FIG. 5), that performs either or both of the processes described herein for one or more customers. In return, the service provider can receive payment from the customer(s) under a subscription and/or fee agreement, receive payment from the sale of advertising to one or more third parties, and/or the like.

As used herein, it is understood that "program code" means any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as some or all of one or more types of computer programs, such as an application/software program, component software/a library of functions, an operating system, a basic I/O system/driver for a particular computing, storage and/or I/O device, and the like.

Aspects of the invention can take the form of an entirely software embodiment or an embodiment containing both hardware and software elements. In an embodiment, aspects of the invention are implemented in software, which includes but is not limited to firmware, resident software, microcode, etc. Furthermore, aspects of the invention can take the form of a computer program product accessible from at least one computer-usable or computer-readable medium storing program code for use by or in connection with a computer or any instruction execution system. For the purposes of this description, a computer-usable or computer readable medium can be any tangible apparatus that can contain, store, communicate, propagate, and/or transport the program for use by or in connection with the instruction execution system, apparatus, device, and/or the like.

The medium can be an electronic, magnetic, optical, electromagnetic, infrared, or semiconductor system (or apparatus or device), a propagation medium, and/or the like. Examples of a computer-readable medium include, but are not limited to, a semiconductor or solid state memory, magnetic tape, a removable computer diskette, a random access memory (RAM), a read-only memory (ROM), a rigid magnetic disk and an optical disk. Current examples of optical disks include, but are not limited to, compact disk-read only memory (CD-ROM), compact disk-read/write (CD-R/W) and DVD.

A data processing system suitable for storing and/or executing program code can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:
1. A method of generating an application, the method comprising:
    loading source code for an application into a memory of a computing system,
    compiling the source code into program code for the application, and during the compilation of the source code:

for each reference to application data determined as likely to generate a memory miss, adding at a position in the program code that is several operations prior to the reference a push request into the program code for a memory-side data prefetch to the program code for the referenced application data, wherein the memory-side data prefetch causes a near memory processor (NMP) to copy referenced application data for the application from random access memory to an L2 cache; and thereafter adding a prefetch request for a processor-side data prefetch to the program code at a position in the program code that is a number operations prior to the reference equivalent to a number of operations required to complete the prefetch, wherein the processor-side data prefetch causes a main processor that is different than the NMP to copy the application data from the L2 cache to an L1 cache.

2. The method of claim 1, further comprising analyzing a memory access pattern for the application to identify at least one of:
the application data, a location in the program code for the push request, or a location in the program code for the prefetch request.

3. The method of claim 2, wherein the analyzing includes determining that a request to access the application data is likely to incur a memory miss.

4. The method of claim 2, wherein the analyzing includes analyzing at least one of:
application data dependencies or application data structure types at compile-time.

5. The method of claim 2, wherein the analyzing includes analyzing application data access patterns of the application during runtime.

6. The method of claim 1, further comprising translating source code for the application into the program code.

7. The method of claim 1, wherein the push request causes a program to be executed by an execution environment separately from the application.

8. The method of claim 7, wherein the improving further includes defining a custom program for the program.

9. The method of claim 1, further comprising:
performing a set of high level optimizations on the program code prior to the improving; and
performing a set of low level optimizations on the program code after the improving.

10. A computer hardware system for generating an application, the system comprising:
at least one processor, wherein the at least one processor is configured to
load source code for an application into a memory of the computing hardware system,
compiling the source code into program code for the application, and during the compilation of the source code:
for each reference to application data determined as likely to generate a memory miss, add at a position in the program code that is several operations prior to the reference a push request into the program code for a memory-side data prefetch to program code of the application for the referenced application data, wherein the memory-side data prefetch causes a near memory processor (NMP) to copy referenced application data for the application from random access memory to an L2 cache; and
thereafter add a prefetch request for a processor-side data prefetch to the program code at a position in the program code that is a number operations prior to the reference equivalent to a number of operations required to complete the prefetch, wherein the processor-side data prefetch causes a main processor that is different than the NMP to copy the application data from the L2 cache to an L1 cache.

11. The system of claim 10, wherein the at least one processor is further configured to
analyze a memory access pattern for the application to identify at least one of:
the application data,
a location in the program code for the push request, and
a location in the program code for the prefetch request.

12. The system of claim 11, wherein
the analyzing includes determining that a request to access the application data is likely to incur a memory miss.

13. The system of claim 11, wherein
the analyzing includes analyzing at least one of:
application data dependencies and
application data structure types at compile-time.

14. The system of claim 11, wherein
the system for analyzing includes a system for analyzing application data access patterns of the application during runtime.

15. The system of claim 10, wherein the at least one processor is further configured to
translate source code for the application into the program code.

16. The system of claim 10, wherein
the push request causes a program to be executed by the execution environment separately from the application.

17. The system of claim 10, wherein the at least one processor is further configured to:
perform a set of high level optimizations on the program code prior improving access to the application data; and
perform a set of low level optimizations on the program code after the improving access to the application data.

18. A computer program product comprising at least one non-transitory computer-readable storage medium having stored therein computer usable program code for generating an application, which when executed by a computer hardware system, causes the computer hardware system to perform:
loading source code for an application into a memory of a computing system,
compiling the source code into program code for the application, and during the compilation of the source code:
for each reference to application data determined as likely to generate a memory miss, adding at a position in the program code that is several operations prior to the reference a push request into the program code for a memory-side data prefetch to the program code for the referenced application data, wherein the memory-side data prefetch causes a near memory processor (NMP) to copy referenced application data for the application from random access memory to an L2 cache; and
thereafter adding a prefetch request for a processor-side data prefetch to the program code at a position in the program code that is a number operations prior to the reference equivalent to a number of operations required to complete the prefetch, wherein the processor-side data prefetch causes a main processor that is different than the NMP to copy the application data from the L2 cache to an L1 cache.

19. The computer program product of claim 18, wherein the computer hardware system is further configured to perform
    analyzing a memory access pattern for the application to identify at least one of:
        the application data,
        a location in the program code for the push request, and
        a location in the program code for the prefetch request.

20. The computer program product of claim 18, wherein the computer hardware system is further configured to perform
    translating source code for the application into the program code.

21. The computer program product of claim 18, wherein the push request causes a program to be executed by the execution environment separately from the application.

22. The computer program product of claim 21, wherein the computer hardware system is further configured to perform
    defining a custom program for the program.

\* \* \* \* \*